US007719197B2

(12) United States Patent
Martin et al.

(10) Patent No.: US 7,719,197 B2
(45) Date of Patent: May 18, 2010

(54) FINITE STATE MACHINE VEHICLE HEADLIGHT CONTROLLER

(75) Inventors: Jessica M. Martin, Fort Wayne, IN (US); John F. Rotz, Fort Wayne, IN (US); Deborah M. Fogt, Fort Wayne, IN (US); H. Edward Kelwaski, Craigville, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 901 days.

(21) Appl. No.: 11/537,009

(22) Filed: Sep. 29, 2006

(65) Prior Publication Data
US 2008/0088427 A1    Apr. 17, 2008

(51) Int. Cl.
B60Q 1/02    (2006.01)
B60Q 1/26    (2006.01)

(52) U.S. Cl. .......................................... 315/82; 340/468
(58) Field of Classification Search ................... 315/76, 315/77, 78, 80, 82, 83, 84; 340/468, 469
See application file for complete search history.

(56) References Cited
U.S. PATENT DOCUMENTS

| | | | |
|---|---|---|---|
| 4,213,075 A | 7/1980 | Ericson | |
| 5,473,306 A * | 12/1995 | Adell | 340/468 |
| 5,561,363 A * | 10/1996 | Mashino et al. | 322/25 |
| 5,671,141 A | 9/1997 | Smith et al. | |
| 6,566,816 B2 * | 5/2003 | Fushimi et al. | 315/82 |
| 6,936,969 B2 * | 8/2005 | Gourdine | 315/82 |
| 2003/0066050 A1 | 4/2003 | Wang et al. | |

OTHER PUBLICATIONS

StateWORKS Studio, "Traffic light control—case study.".
Flora-Holmquist, Alan R., Edward Morton, James D. O'Grady, and Mark G. Staskauskas, "The Virtual Finite-State Machine Design and Implementation Paradigm," Bell Labs Technical Journal. Winter 1997.

* cited by examiner

Primary Examiner—Douglas W Owens
Assistant Examiner—Minh D A
(74) Attorney, Agent, or Firm—Jeffrey P. Calfa; Mark C. Bach

(57) ABSTRACT

A headlight control system provides a several automated operational features. A problem with such systems in the past is the possibility of inadvertent operation of the vehicle without headlights under low light or other adverse conditions. Automated control is achieved through use of a finite state machine which defaults from a plurality of transient conditions to a running state which provides operational outputs to the low beam bulbs of the headlights.

10 Claims, 3 Drawing Sheets

FINITE STATE MACHINE VEHICLE HEADLIGHT CONTROLLER

BACKGROUND OF THE INVENTION

1. Technical Field

The present invention relates generally to control of headlights on commercial motor vehicles and more particularly to a control system implemented in a finite state machine which affords control flexibility while avoiding unanticipated responses.

2. Description of the Problem

Headlights serve several functions on a motor vehicle including: providing forward lighting for visibility under conditions of limited ambient light; increasing the visibility of the vehicle to other drivers (running light functionality); and affording a means of signaling to other drivers. Local laws governing headlight operation may differ as to time of day the lights are to be on. In addition, some locales require headlights to be illuminated if the windshield wipers have been turned on due to rain. In other locations it may be required that headlights be turned off at a weigh-station. Signaling to indicate an attempt to pass, or to indicate to a passing vehicle that a sufficient interval has opened to allow the passing vehicle to return to a lane may involve turning lights on, or off, depending upon the state of the lights prior to the signal.

Headlights were formerly directly connected to switches installed in the vehicle passenger compartment or cab. Contemporary control schemes for vehicle electrical systems have favored substituting programmable controllers and controller area networks ("CAN") for direct wiring between switches and loads. CAN systems and controllers afford a high degree of flexibility in application, the potential of a richer feature set and a commensurate opportunity for greater automation than direct wired systems. Mechanically CAN systems are much simpler than the traditional wiring harnesses and, possibly more importantly, the basic wiring does not change with the additions of features. However, providing against unanticipated operation stemming from programming omissions or changes in such systems takes on particular importance. Headlights are an example of a system where avoiding unintended operations is important in view of the need for headlights for safe vehicle operation under low ambient light conditions.

Finite state machine descriptions of desired system behavior have recently found favor as a method of programming a system to provide greater assurance of fault-free behavior. It would be desirable to provide a control system for headlights which makes headlight operation for the desired function as simple as possible, which minimizes the chance of accidental illegal operation, which automates functions but automatically ensures headlight operation when legally required or on account of low ambient light conditions.

SUMMARY OF THE INVENTION

According to the invention there is provided a headlight control system achieving a high degree of automation while preventing unintended operation of the vehicle without headlights under low light or rainy conditions. The headlight control system is implemented through conventional contemporary control systems in response to onboard sensors and switches which generate physical inputs to the control system. A finite state machine is implemented on a programmable controller of the control system, which sets a state in response to the inputs and potentially to the previous state. Each new state, as is conventional, determines values for the control outputs to the headlights. Implementation of control through a finite state machine accommodates at least a first automated operational feature. Among the states provided is a low or normal illumination state which sets outputs for operation of the low, but not the high beams of the headlights. Transient conditions are defined from all other possible states to the normal illumination state to avoid any unanticipated extinguishment of the headlights during vehicle operation. Generally, transients to the normal illumination state are based on the negation of a condition which previously obtained. They include any change in the inputs other than the specific combination required to move to a state other than the normal illumination state.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
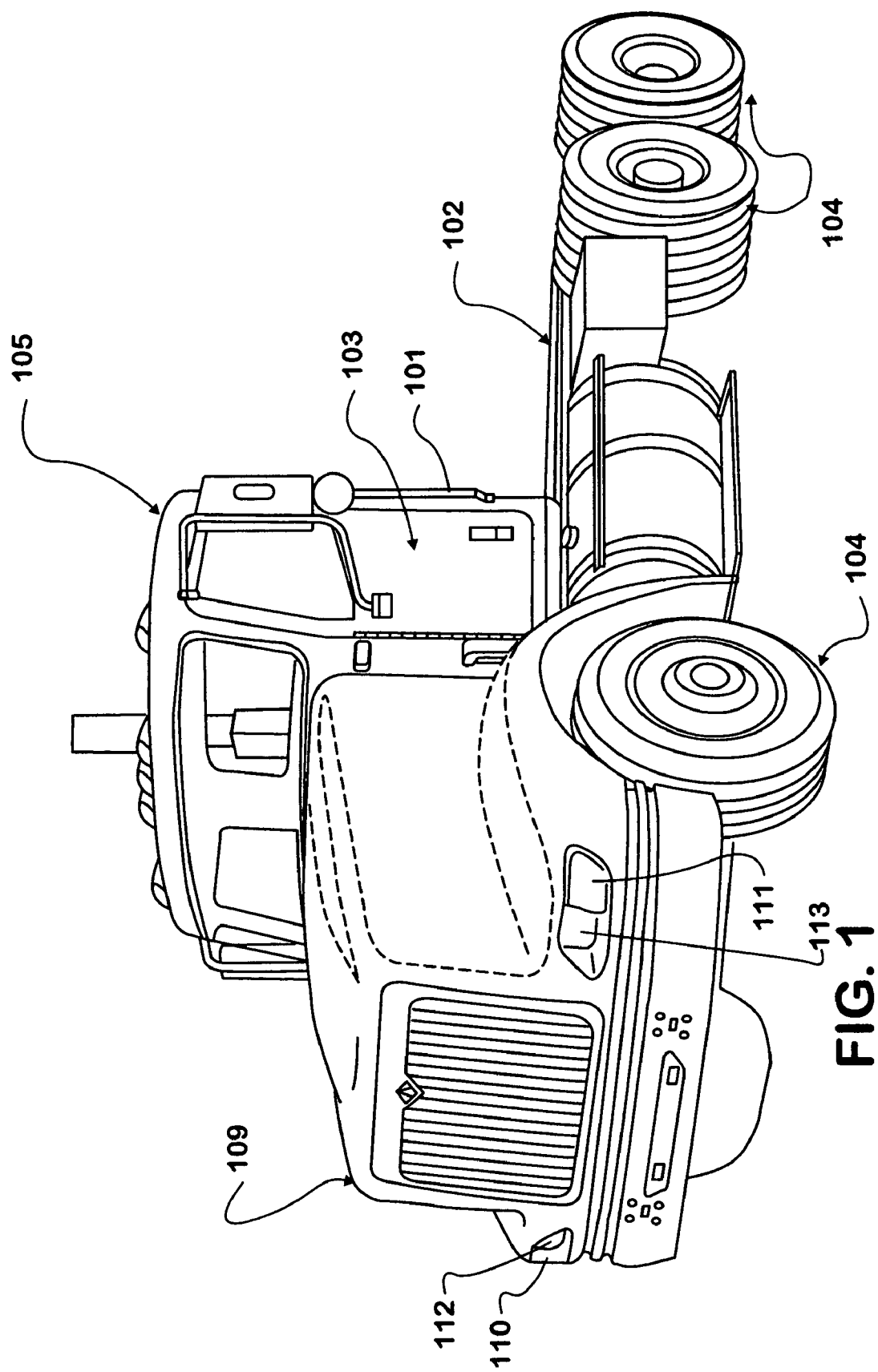
FIG. 1 is a perspective view of a commercial tractor for the over the road trucks equipped with a headlight system with which the present invention is advantageously employed.

Referring to the drawings and in particular referring to FIG. 1 a tractor 105 is illustrated. Tractor 105 is conventionally configured as a cab 101 on frame 102 design, carried on wheels 104. A door 103 provides access to cab 101. A hood 109 forms the front portion of the cab. The headlights 110, 111, 112, 113 are mounted at the front of the hood 109. Headlights 110, 111, 112, 113 may be operated to provide normal (low beam) and enhanced (low and high beam) forward illumination to allow low ambient light operation of the tractor 105. Operation of the headlights 110, 111, 112, 113 may be temporarily engaged or interrupted as a way of signaling to other drivers. Such signaling conventionally includes flashing the headlights 110, 111, 112, 113 on from an off state to indicate an intention on the part of the operator of tractor 105 to pass, or flashing high beam headlights 112, 113 on when the tractor's low beam headlights 110, 111 alone are on, also to indicate an intention to pass. The headlights 112, 113 may be turned off from the enhanced forward illumination state to indicate passing as well. Any operational state of the headlights 110, 111, 112, 113 may be interrupted (i.e. all forced off), as is sometimes done to indicate to a passing vehicle that a sufficient interval has opened in front of the truck 105 to allow a change of lane into the lane occupied by tractor 105. Although not described here, the tail marker lights may be operated in conjunction with the headlights.

Figure 2:
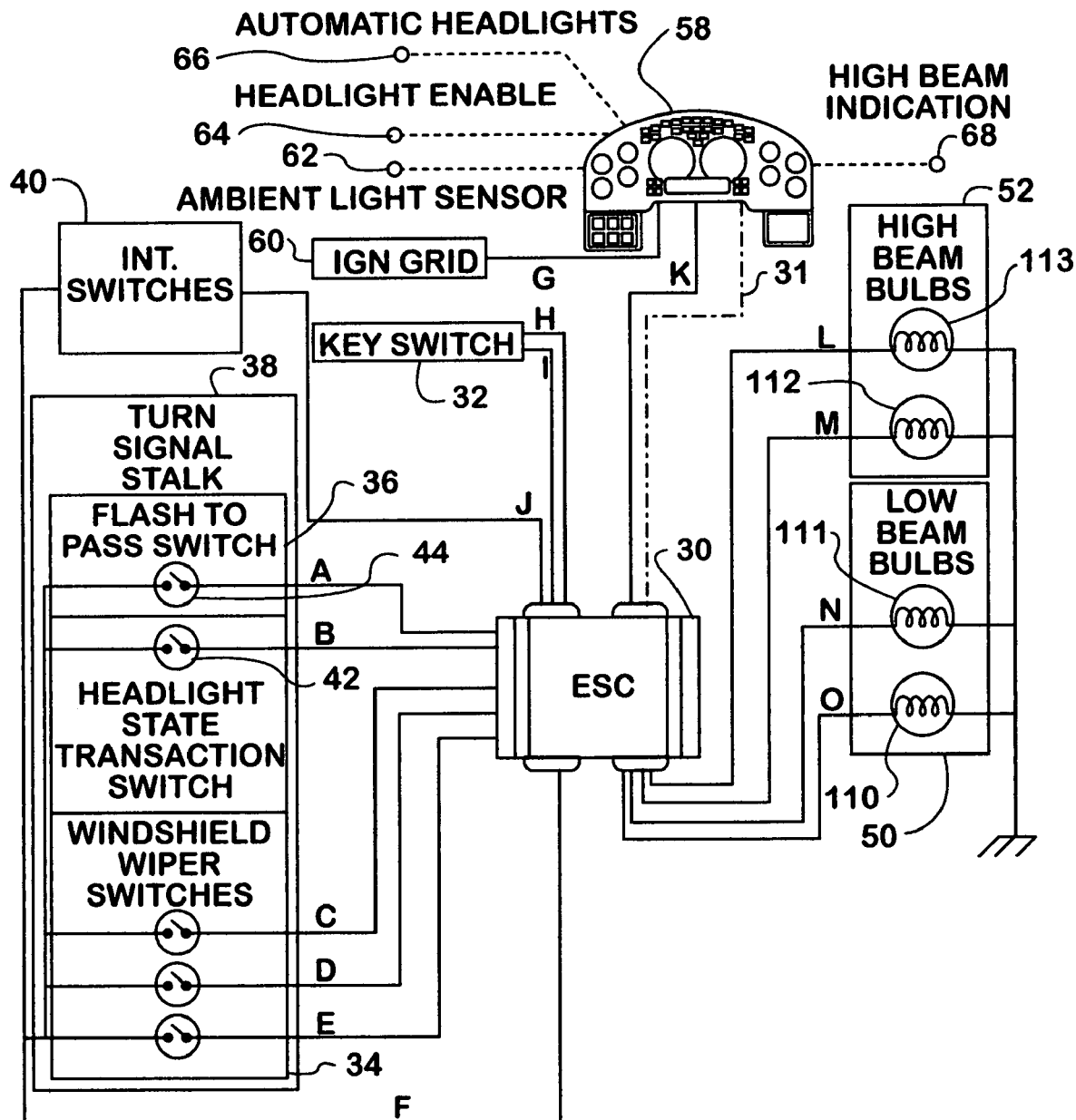
FIG. 2 is a combined high-level block diagram and circuit for headlight operational control in accordance with the invention.

FIG. 2 illustrates communication links, hard wire connections to switches, and indicates signals applied to an electrical system controller (ESC) 30 for implementing control over headlights 110, 111, 112 and 113. Headlights 110, 111, 112 and 113 are operated in response to inputs generated from several manual switches and, optionally, automatic sensors. The manual switches are not necessarily primarily for headlight control. ESC 30 is a category of body computer which may be programmed to implement most of the control scheme of the present invention. ESC 30 is linked to an electrical gauge control (EGC) 58 which controls most of the vehicles gauges, warning lights and which accepts many control inputs from most dashboard switches. The link between ESC 30 and EGC 58 is controller area network (CAN) bus 31 which conforms to the SAE J1939 protocol and which carries industry standard messages and allows for user defined messages. CAN's are data networks characterized in part by a messaging regime which does not specify destinations for the messages. Rather, messages are identified by source and type, and each controller connected to the bus receives the message and responds thereto based on its own programming. Thus a message originating with ESC 30 may be acted upon simultaneously by EGC 58, a transmission controller (not shown), an engine controller (not shown), etc. Here however, only EGC 58 and ESC 30 are shown from among the controllers which may be connected to CAN bus 31.

While most dashboard switches are connected to the EGC 58, most of the switches of direct interest to headlight control are connected by discrete wires directly to the ESC 30. This architecture is not necessary to the invention, and may not be duplicated in other manufacturers' vehicles, or even in future vehicles of the assignee of this patent. Among the switches connected directly to the ESC 30 is a four-position key switch 32. The key switch 32 is engaged using the vehicle key and includes an off position, an accessory position, a run position and a cranking position. Two signal leads are connected from key switch 32 to the ESC 30 allowing application of signals H and I to the ESC. Because each signal line has an on/off state each of the four possible states of the key switch 32 may be indicated as an input to ESC 30.

The direct application of so many signal inputs to the ESC 30 stems from the disposition of these switches in the turn signal stalk 38. The turn signal stalk 38 includes a momentary switch set 36, which provides two inputs A and B to the ESC 30 and a set 34 of windshield wiper switches, which provides signals C, D and E to the ESC 30. Momentary switch set 36 includes two switches, a flash to pass switch 44 and a headlight state transition switch 42. Closure of these switches affects the states of signals A and B, respectively. The windshield wiper switches 34 are indirectly related to headlight operation. Some vehicles may be equipped for automatic headlight operation when the windshield wipers are in operation including intermittent operation, but excluding wiper operation initiated in response to the use of window washing fluid. Accordingly, selected combinations of signals C, D and E may invoke headlight operation. The windshield wiper switch set 34 and the momentary switch set 36 provide a logic high signal at a zero volt return (ZVR) level provided by the ESC 30 as signal "F".

A set of steering wheel-mounted interrupt switches 40 is connected to provide input "J" to the ESC 30. The interrupt switches 40 are a ladder network of three switches which include a headlight interrupt switch and a marker light interrupt switch.

The EGC 58 is connected to receive various inputs related to headlight operation. Among these inputs are a headlight enable switch 64 and an automatic headlight operation enable switch 66. Engaging the automatic headlight operation enable switch allows the ESC 30 to respond to ambient light conditions as detected by an ambient light sensor 62. The headlight switch 64 mimics a conventional, hard-wired headlight on/off switch. An IGN grid switch 60 simply indicates if the ignition is on or off (signal G) directly to the EGC 58. The EGC 58 provides messages over CAN bus 31 indicating values for all of these inputs which may be acted upon by the ESC 30. EGC also illuminates a high beam indicator 68 in response to a message received over CAN bus 31 from the ESC 30. Positioning of the controls on the dash, on the steering wheel and on the turn signal stalk 38 place all of the controls within easy reach of a driver.

The EGC 58 passes signals to ESC 30, both over CAN bus 31 and over a hard wired, dedicated connection as indicated by signal "K". The "K" signal is a headlight enable signal and duplicates a headlight enable message provided over the CAN bus 31. It is necessary that at least the low beam headlights 110, 111 work even if operation of the ESC 30 or EGC 58 has become degraded or the CAN bus 31 has failed. Although not all of the uses of the discrete headlight enable signal K are shown, its presence on a line duplicating a message on bus 31 is illustrative of some the redundancy built into the system. However, the present application is concerned primarily with normal operation of the ESC 30, not hardware redundancies built into the system to deal with failure of the ESC or EGC 58.

The ESC 30 incorporates internal power FET switches for applying power to each of the headlight bulbs 110, 111, 112, 113. Low beam bulbs 110, 111 are grouped as low beam bulbs 50 and the high beam set 52 is similarly organized from high beam bulbs 112, 113. The individual control output signals are labeled L, M, N and O.

In terms of broad design parameters, the headlights 110, 111, 112, 113 are operated with all lights off, or with the low beams 50 on and the high beams 52 off, or with both the low and high beams on. Such of headlights 110, 111, 112, 113 as are on must be able to turn off in unison. ESC 30 may be programmed for lights on with wipers ("LOWW"). LOWW provides for the low beam headlights 110, 111 automatically turning on when the wipers are engaged (other than for washing). The low beams 50 remain on until the wipers are turned off and the headlights are manually turned off, which may occur either by operation of the headlight enable switch 64 or the key switch 32 moving to off. The wiper switches 34 are representative of a system secondary to the lights' operation which may be related to the lights by programming of the ESC 30.

The EGC 58 has a multiple position switch (the headlight enable switch 64) providing an ON and an OFF input. Automatic headlight enable 66 is push button switch with the instruction becoming executive upon release of the button. Enable 66 includes an indicator light which is on when automatic headlight operation is enabled. A low light condition is defined as less than 1000 lux (plus or minus 15%) measured by an upward pointed light sensor 62 (SAE J2087). To enter a low light condition the upward pointing sensor 62 must measure less than 1000 lux for one continuous minute. Before indication of a low light condition is cancelled, the sensor must measure greater than 1000 lux for five continuous minutes. An indication of a low light condition is the default status, and accordingly, if no result is obtainable, the EGC 58 indicates that a low light condition is present.

The EGC 58 provides an operating voltage on the headlight enable signal line "K" when the headlight enable switch 64 is on or all three of the following conditions obtain: automatic headlights 66 are active; the key as indicated by the ignition grid 60 is ON; and a low light condition exists (indicated by sensor 68). The EGC 58 transmits a "request for headlights" message when the headlight enable switch 64 is in the ON position. The EGC 58 concurrently transmits a request for "automatic headlights" over CAN bus 31 when: automatic headlights are active; the ignition grid in ON; and a low light condition exists.

Before turning to the state transition graph for the finite state machine (FSM) 80, the virtual inputs to the state machine, which are generated by the external conditions already described, are defined. A flash to pass request occurs when the ESC 30 measures a transition to logic low (ZVR) on the flash to pass switch 44 (signal "A") and the key is in the RUN position (signals H, I). There is no longer a flash to pass request when the ESC 30 no longer measures logic low for the "A" signal. A headlight state transition request happens when the ESC 30 measures a transition to logic low from the headlight state transition switch 42. A headlight request happens when any one (or more) of the following conditions obtains: (1) the ESC 30 measures operating voltage on the headlight enable input "K" from the EGC 58; (2) the EGC 58 transmits a message over the CAN bus 31 indicating a headlight request; or (3) the EGC 58 transmits a message over the CAN bus 31 indicating an automatic headlight request. A headlight Interrupt request occurs when the ESC 30 measures the voltage level which results from closure of the headlight interrupt switch in the ladder interrupt switch network 42. This result obtains only if the (marker) interrupt switch is not concurrently closed. In other words, if the headlight and marker interrupt switches are closed during the same clock cycle no interrupt is recognized. A headlight interrupt request no longer occurs when the output of the interrupt switch 42 is no longer at the recognized logic level. The windshield wipers are on when the combination of windshield wiper switches 34 is in any state other than off and wash. The off state of the windshield wipers does not include the non-movement state of the intermittent setting of the wipers. It is assumed that the wipers require the ignition switch 32 to be in the RUN state before becoming operational.

Figure 3:
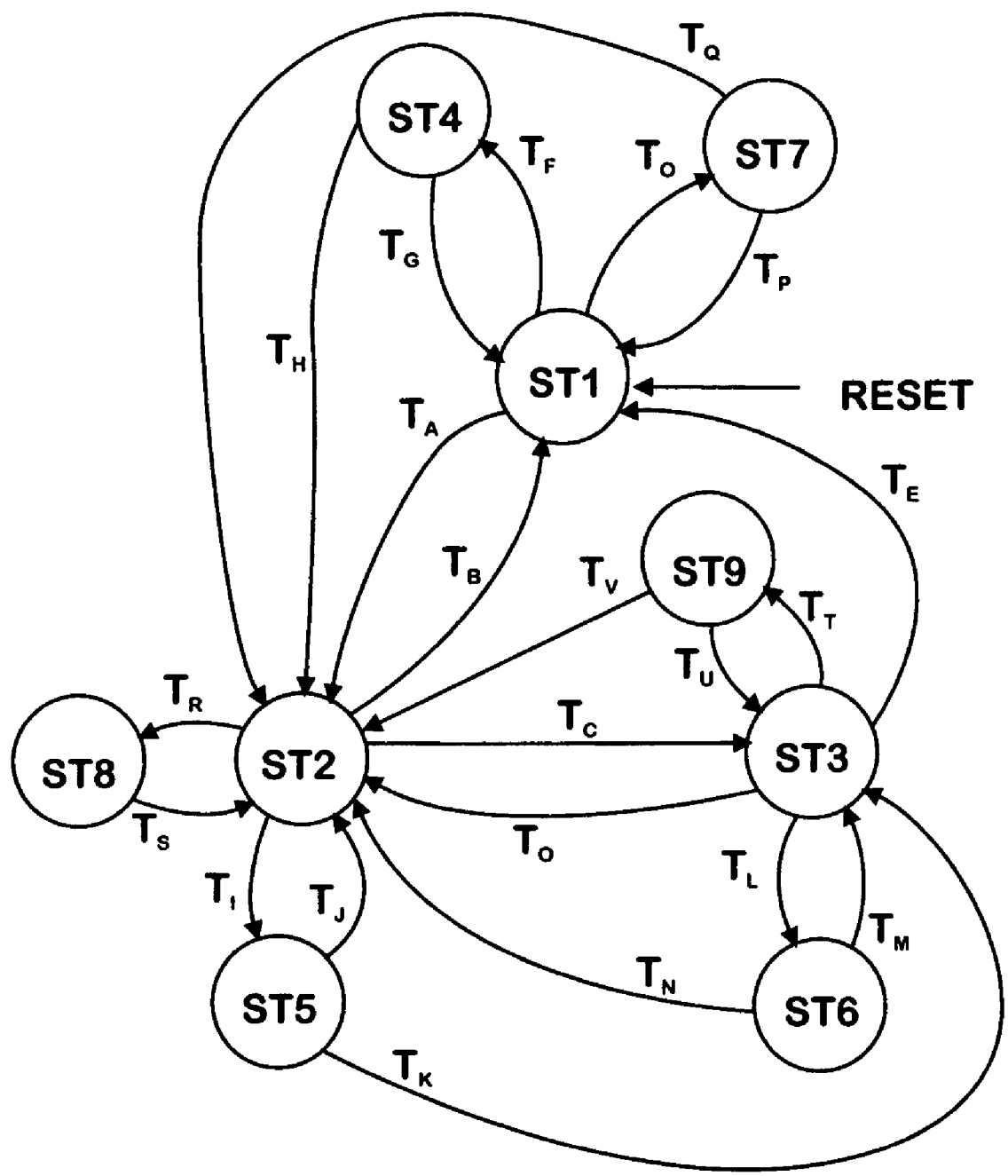
FIG. 3 is a state transition graph illustrating non-emergency operation of the head light system.

Referring now to FIG. 3, a state transition graph for FSM 80 is described. The outputs from all of the states are headlight control signals (i.e. L, M, N and O). For non-emergency vehicles outputs L and M (the high beams) are always the same as each other. Outputs N and O are always the same as each other (the low beams). Applications to emergency vehicles may use alternating illumination of headlights for signaling (for example on a tow truck). The preferred embodiment described here is for a conventional commercial tractor, and, while the invention could be extended to other types of vehicles, the preferred embodiment does not include such extensions of the control system.

The preferred embodiment of the state machine 80 defines nine states. Since the headlights are either all off, in operation with just the low beams on, or all on, it is obvious that some states generate duplicate outputs. This is because some state definitions include a reference to the previous state, that is, the state machine has memory. Some state definitions here, ST4, ST5, ST6, ST7, ST8 and ST9, are termed temporary states and include a reference or indication of what the immediately prior state of the system was. Put more concretely, these states correspond typically to conditional changes in output, such as flash to pass signaling. The remaining states may be termed the base states, that is they correspond to normal operational use of the lights, that is off, low beams and high beams. The base states are ST1, ST2 and ST3. The state ST1 is an idle state. In the idle state all of the headlight control signals are low (i.e. the headlights are off). ST2 is termed the low illumination state which is employed for providing conventional low light visibility. In ST2 the outputs to the low beams are high and the high beam outputs are set to low. ST3 is termed the enhanced illumination state which is employed for increased visibility under low light conditions. In colloquial terms, the high beams are on. In ST3 both the low and high beam control signals are high. The definition of a base state does not require a reference to any preceding state.

The temporary states correspond to interruptions of normal operation. The state machine always defines a return path from a temporary state to a prior base state. In the preferred embodiment all temporary states have a base state as the immediately preceding state. ST4 is the flash to pass from the lights off/idle state ST1. Both the low and high beam outputs are high. The state ST5 is the flash to pass from the low illumination state ST2. The outputs dictated by this state are for both the low and high beams to be high. The ST6 state is the flash to pass from the enhanced illumination state ST3. In the ST6 state only the low beam signal is high. The ST7 state is the interrupt state from the idle state ST1. In ST7 the headlight outputs are both low. It might be added here that the reason for having such a state is related to the possible existence of the automatic headlight feature. Consider a truck at a weigh station where it is required that headlights be off when the vehicle is on or in the vicinity of the scales. Should the windshield wipers be engaged or low light conditions occur during waiting the driver would temporarily extinguish the lights to conform to the station's requirements. In the ST7 state such engagement is temporarily suspended. The ST8 state is a headlight interrupt from the low illumination state ST2. The ST9 state is the headlight interrupt from the high illumination state ST3. In the ST8 and ST9 states the outputs to both the high and low beams are low. It may be observed that the states termed "temporary states" can only be reached from one of states ST1, ST2 or ST3. Transitions out of the temporary states are either back to the origin state or to the ST2 state.

Transitions between states occur upon certain inputs, as defined above, occurring. The simplest transition relates moving from an off to the basic level of illumination used for enhancing visibility under low light conditions, that is, the outputs associated with state ST2. Transition TA from ST1 to ST2 occurs when there is no flash to pass input and one of the following occurs: (1) there is a headlight request input; (2) lights on with wipers is enabled and the wipers are on.

Stringent conditions are required to avoid having a driver accidently turn the headlights off since conditions may have changed since the lights were turned on. For example, the headlights may have turned on automatically due to the windshield wipers having been turned on. Later, low light conditions may be satisfied, but the driver may turn the wipers off. The system should keep the headlights on despite the wipers being turned off. Stated more generally, additional operator inputs are required to turn headlights off after disappearance of a condition which gives rise to their automatic activation. Here the term automatic comprehends activation of the lights upon activation of an auxiliary system. This is pertinent when dealing with states relating to use of the headlights for illumination, or which are subsidiary to states where the headlights are used for illumination. States ST2 and ST3 reflect use of lights for illumination. Accordingly, transitions from those states to idle are logically complex. The transition $T_B$ from ST2 to ST1 and similarly the transition $T_E$ from ST3 to ST1 are logically complex events as expressed in the following logical formula:

there is no headlight state transition request input
    AND there is no flash to pass request input
    AND ((there is no headlight request
        AND lights on with wipers is disabled)
        OR (lights on with wipers is enabled
            AND the windshield wipers are not on AND there is no headlight request
AND (the key switch 60 is in the OFF position
OR the windshield wipers are not on before there is not a headlight request))).

The next input to be considered is that of a headlight state transition request, which occurs in response to a logic low transition of signal "B". Basically, the event dealt with here is moving between the use and the cancellation of use of headlight high beams for illumination, but not signalling. The corresponding transitions are transitions $T_D$ and $T_C$, that is, back and forth between states ST2 and ST3. It is also possible for a driver request a transition between high beams and low beams and just low beams while also using the flash to pass feature. Accordingly, the states which reflect invocation of the flash to pass feature from a state where the headlights are in use must be considered, i.e. states ST5 (flash to pass from the low illumination state) and ST6 (flash to pass from the enhanced illumination state). The corresponding transitions are $T_K$ and $T_V$ which provide for transitions from ST5 to ST3 and from ST6 to ST2, respectively. Transitions $T_C$, $T_D$, $T_K$ and $T_N$ occur in response to a headlight state transition request provided only that the current state allows such.

A flash to pass request is honored from the idle state ST1. Transition $T_F$ from ST1 to ST4 occurs when there is low logic transition from the flash to pass switch 44 (signal "A"). The state transitions back to ST1 (transition $T_G$) upon release of the flash to pass request and no manual or automatic headlight request has been received during the period (clock cycles) the flash to pass was requested. A return to the idle state ST1 is not permitted from a flash to pass output state if it was entered from either the low illumination state ST2 or the enhanced illumination state ST3. Logically a transition occurs when:
there is not a flash to pass request
AND (there is not a headlight request
AND (lights on with wipers is not enabled
OR (lights on with wipers is enabled
AND the wipers are not on))).

When there is an initial headlight request, a transition to low beam headlights 110 on is the default state. In other words, the headlights cannot start in the high beam state. Transitions out of the flash to pass from the idle state ST4 are allowed to return to the idle state or to low illumination state ST2. ST2 is the destination state in response to any headlight request after release of the flash to pass switch. The transition $T_H$ thus follows when:
there is not a flash to pass request
AND (there is a headlight request
OR (lights on with wipers is enabled
AND the wipers on on)).

Flash to pass requests from one of the headlight operational states ST2 or ST3, initiated using the flash to pass switch 44, are honored as long as no concurrent headlight transition request occurs. Transitions from one of the illumination states to the corresponding flash to pass states (transitions $T_I$ and $T_L$ to states ST5 or ST6) thus occur when:
there is a flash to pass request
AND there is not a headlight state transition request.

Flash to pass states default back to the illumination state that they were entered from upon release of the flash to pass switch 44. Transitions $T_J$ and $T_M$ occur from states ST5 and ST6 when:
there is not a flash to pass request
AND there is not a headlight transition request.

As already described, logically, the system allows the headlight operation to be "interrupted" even when the headlights are not in use. The practical effect of this is to suppress automatic operation of the headlights in locations where the headlights are not desired for as long as the interrupt is maintained. Hence a transition $T_O$ is provided from the idle state ST1 to an interrupt from idle state ST7. The conditions for transition $T_O$ are:
there is a headlight interrupt request
AND there is not a flash to pass request
AND (there is not a headlight request
AND (lights on with wipers is not enabled
OR (lights on with wipers is enabled
AND the wipers are not on))).

The transition $T_P$ from the interrupt from idle state ST7 back to the idle state ST1 occurs with release of the interrupt request absent any intervening headlight request. The conditions for transition $T_P$ are:
the headlight interrupt request has been discontinued
AND there is not a headlight request
AND (lights on with wipers is not enabled
OR (lights on with wipers is enabled
AND the wipers are not on))).

As described above, headlight interrupts suppress headlight operation from any of states ST1, ST2 and ST3. Operation can be returned by one of the interrupt states ST7, ST8 or ST9 to a preceding state, or to the low illumination state ST2. Thus transition $T_Q$ from ST7 to ST2 accounts for an intervening headlight request occurring during the interrupt from idle state ST7. The logic of the transition is:
(There is a headlight request
OR (lights on with wipers is enabled
AND the wipers are on)).

The system allows normal headlight operation to be "interrupted" from either the low illumination state ST2 or the enhanced illumination state ST3. Transitions $T_R$ and $T_T$ provide for transitions from states ST2 and ST3 to states ST8 and ST9, respectively. The transition conditions are:
there is a headlight interrupt request
AND there is not a flash to pass request
AND there is not a headlight state transition request
AND (there is a headlight request
OR (lights on with wipers is enabled
AND the wipers are on)).

The transition $T_S$ from the interrupt from low illumination state ST8 back to the low illumination state ST2 occurs with release of the interrupt request or there is a new, intervening headlight request. The conditions for transition $T_S$ are:
the headlight interrupt request has been discontinued
OR there is a new headlight request
OR (lights on with wipers is enabled
AND the wipers are on and it is a new request).

The transition $T_U$ from the interrupt from the enhanced illumination state ST9 back to the enhanced illumination state ST3 occurs with release of the interrupt request but only absent a new, intervening headlight request. The conditions for transition $T_U$ are:
the headlight interrupt request has been discontinued
AND there is not a new headlight request
AND (lights on with wipers is not enabled
OR (lights on with wipers is enabled
AND the wipers are not on in response to a new request)).

The transition $T_V$ from the interrupt from enhanced illumination state ST9 to the low illumination state ST2 occurs when there is a new, intervening headlight request, maintaining the operational doctrine that all new requests for headlights default to the low illumination state. A release of the interrupt condition is not required. The conditions for transition $T_V$ are:
there is a new headlight request
OR (lights on with wipers is enabled
AND the wipers are on and it is a new request).

Although outside the scope of this discussion, which deals with normal operation of a headlight control system through a finite state machine, ESC 30 is hardware modified to provide low beam power outputs upon failure of the processing portions of ESC 30 in response to a logically high K signal (which provides an operational voltage level). Under these circumstances all other headlight functionality is lost however.

The invention provides for simplified headlight control consistent with a degree of automation and with preventing unintended operation of the vehicle, even briefly, without headlights under low light or rainy conditions. For purposes of the claims automatic headlight responses are considered those associated with low light sensors or operation of the wind shield wiper controls.

While the invention is shown in only one of its forms, it is not thus limited but is susceptible to various changes and modifications without departing from the spirit and scope of the invention.

What is claimed is:

1. A headlight control system for a vehicle comprising:
    low and high beam outputs;
    manually actuable headlight controls;
    a source of automatic headlight control signals;
    a controller for generating on and off signals on the low and high beam outputs;
    a state machine implemented on the controller for generating the on and off signals, the state machine including an idle state, a low illumination state, an enhanced illumination state and a temporary states, and defining transition paths between selected states, including a transition path from any temporary state to the low illumination state, which are followed in response to occurrence of inputs from the manually actuable headlight controls and the source of automatic headlight control signals; wherein the temporary states further comprising: a flash to pass state from the idle state providing on signals to the low and high beam outputs; a flash to pass state from the low illumination state providing on signals to the low and high beam outputs; and a flash to pass state from the enhanced illumination state providing on signals to the low beam outputs and off signals to the high beam outputs.

2. The headlight control system of claim 1, the temporary states further comprising:
    an interrupt state from the idle state;
    an interrupt state from the low illumination state; and
    an interrupt state from the enhanced illumination state.

3. The headlight control system of claim 2, further comprising:
    transition paths from all of the flash to pass states and all of the interrupt states to the low illumination state.

4. The headlight control system of claim 3, further comprising:
    the transition paths from all of the flash to pass states and all of the interrupt states to the low illumination state being invoked from a temporary state in response to any intervening headlight request other than the request which moved the state machine to the temporary state.

5. The headlight control system of claim 4, the manually actuable headlight controls further comprising:
    a headlight enable switch;
    a headlight automatic actuation switch; and
    a headlight state transition switch.

6. The headlight control system of claim 5, the source of automatic headlight control signals further comprising:
    multi-position windshield wiper controls; and
    an ambient light sensor.

7. A motor vehicle comprising:
    low and high beam headlights;
    a control system for turning the low and high beam headlights on and off, the control system including switches for placement on a vehicle dash, a vehicle steering wheel and on a turn signal stalk;
    the switches including a headlight enable switch for generating a headlight request signal, a switch for a system secondary to the headlights which may be enabled to activate the lights concurrently with selected operational states of the secondary system, a headlight state transition switch, a headlight operation interrupt switch;
    an automatic headlight activation source;
    a state machine implemented on the control system, with the control system being connected to receive outputs of the switches and the automatic headlight activation source as inputs and being responsive to the inputs for forcing transitions between states of the state machine; and
    the state machine including an idle state, a low illumination state, an enhanced illumination state and a plurality of temporary states reached only from one of the idle, low or enhanced illumination states; wherein the plurality of temporary states further comprising: a flash to pass state from the idle state providing on signals to the low and high beam outputs; a flash to pass state from the low illumination state providing on signals to the low and high beam outputs; and a flash to pass state from the enhanced illumination state providing on signals to the low beam outputs and off signals to the high beam outputs.

8. The motor vehicle of claim 7, the state machine further comprising:
    a transition path from each temporary state to the low illumination state.

9. The motor vehicle of claim 8, the automatic headlight activation source being an ambient light sensor.

10. The motor vehicle of claim 8, the secondary system being the windshield wiper switch.

* * * * *